United States Patent [19]

Kane

[11] 4,284,395

[45] Aug. 18, 1981

[54] APPARATUS FOR FORMING FILAMENTS

[75] Inventor: John L. Kane, Newark, Ohio

[73] Assignee: Owens-Corning Fiberglas Corporation, Toledo, Ohio

[21] Appl. No.: 99,060

[22] Filed: Dec. 12, 1979

[51] Int. Cl.³ .............................................. B29D 7/02
[52] U.S. Cl. ..................................... 425/66; 19/299; 65/4 R; 65/9; 264/210.8; 425/83.1
[58] Field of Search ................................ 19/156.3, 299; 425/72 S, 66, 83.1; 65/9, 4 R; 264/176 F, 210.8

[56] References Cited

U.S. PATENT DOCUMENTS

| | | | |
|---|---|---|---|
| 2,132,702 | 10/1938 | Simpson | 57/329 |
| 2,897,874 | 8/1959 | Stalego et al. | 65/9 |
| 2,927,621 | 3/1960 | Slayter et al. | 65/9 |
| 3,677,481 | 7/1972 | Haley et al. | 425/72 S |
| 4,085,881 | 4/1978 | Roberson | 226/95 |
| 4,140,508 | 2/1979 | Pelagio | 264/121 |

FOREIGN PATENT DOCUMENTS 1089414 11/1967 United Kingdom .

*Primary Examiner*—Jay H. Woo
*Attorney, Agent, or Firm*—Ronald C. Hudgens; Robert F. Rywalski; Greg Dziegielewski

[57] ABSTRACT

Method and apparatus are provided for forming filaments comprising: means for supplying a plurality of streams of molten material; attenuation means for supplying of moving fluid to attenuate said streams into said filaments; said filaments being entrained in said fluid moving from said attenuation means; and means for separating said filaments entrained in said moving air comprising a foraminous surface having; (a) an intercept region oriented to form an acute angle between a path defined by the entrained filaments approaching said intercept region; and (b) a concave region contiguous with said intercept region oriented such that at least a portion of said concave region is positioned substantially transverse to said path such that a portion of said air passes through said foraminous surface and a portion of said air moves along said foraminous surface to move said filaments therealong.

9 Claims, 1 Drawing Figure

U.S. Patent
Aug. 18, 1981
4,284,395
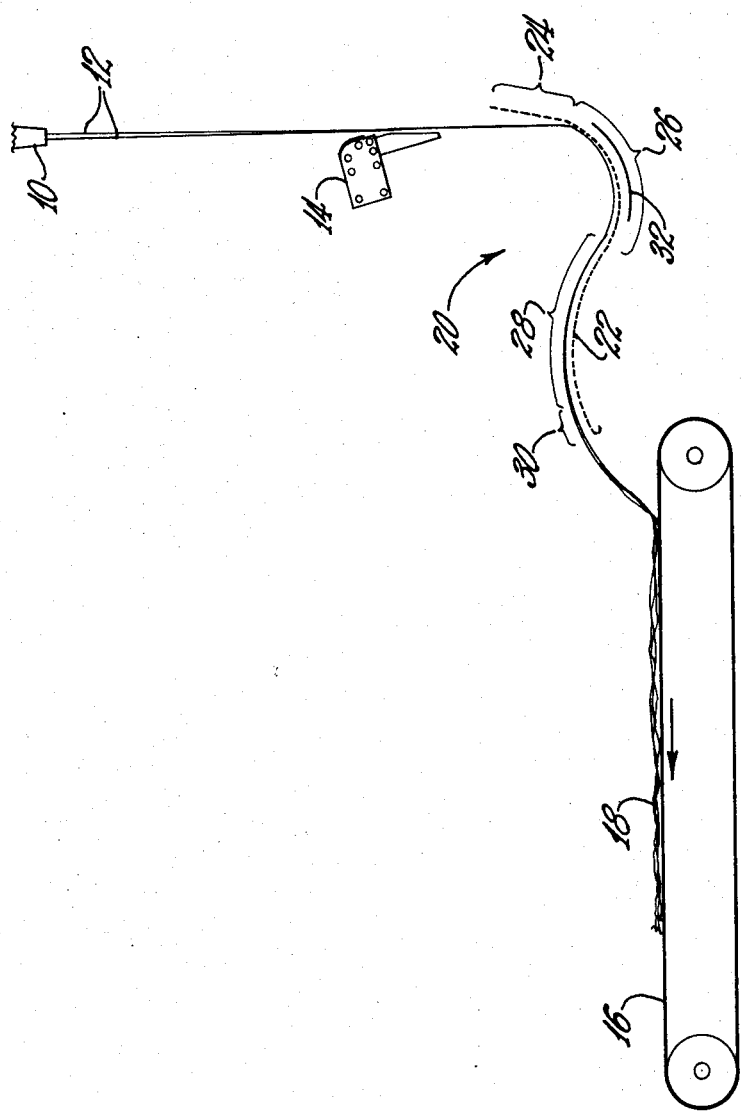

APPARATUS FOR FORMING FILAMENTS

TECHNICAL FIELD

The invention disclosed herein relates to the production and collection of continuous and/or staple filaments wherein the filaments are attenuated by a moving fluid.

BACKGROUND ART

In the production of inorganic or organic filaments wherein molten streams of heat softened material are attenuated into filaments through the action of a moving fluid, it is known that the filaments are entrained in the stream of fluid.

To collect the filaments as a mat or a tow, it is generally necessary to separate the moving air from the filaments and/or dissipate the velocity or kinetic energy of the moving air to promote controlled of the filaments.

In some instances, the distance between the fluidic attenuator and the collection surface is great enough that the stream of attenuating fluid naturally dissipates to allow the filaments to substantially "float" at a substantially reduced rate down to the collection surface. When the distance between the blower and the collection surface is substantially less than the foregoing, positive steps are required to maintain control over the fast moving filaments entrained in the attenuating air at the collection surface.

DISCLOSURE OF THE INVENTION

Method and apparatus are provided for forming filaments comprising: means for supplying a plurality of streams of molten material; attenuation means for supplying of moving fluid to attenuate said streams into said filaments, said filaments being entrained in said fluid moving from said attenuation means; means for separating said filaments from said moving fluid comprising: (a) a foraminous surface having an intercept region oriented to form an acute angle between a path defined by the entrained filaments approaching said foraminous surface and said intercept region; and (b) a concave region contiguous with said intercept region oriented such that at least a portion of said concave region is positioned substantially transverse to said path such that a portion of said fluid passes through said foraminous surface and a portion of said fluid moves along said foraminous surface to move said filaments tangentially along said concave region.

BRIEF DESCRIPTION OF THE DRAWING

The drawing is a semi-schematic front elevational view of a fiber forming position according to the principles of this invention.

BEST MODE OF CARRYING OUT THE INVENTION

As shown, feeder 10 supplies a plurality of streams of molten inorganic or organic material, such as glass, polystyrene, polypropylene and the like. The streams of material are attenuated into filaments 12 by the action of fluidic attenuation means or blower 14 as is known in the art.

Filaments 12 entrained in the attenuating fluid move to and along dissipation/separation system 20 wherein the attenuating fluid is separated and dissipated to promote the controlled deposition of filaments 12 upon conveyor or collection means 16.

Although separation system 20 can be used in conjunction with a vacuum chamber to draw off the attenuating fluid through foraminous surface 22, it has been found due to the characteristics of the geometrical configuration of foraminous surface or screen 22 the proper amount of entrained air can be separated from the moving mass of filaments and attenuating fluid in the absence of a vacuum chamber.

Separation system 20 is comprised of a foraminous surface or screen 22 having a generally straight intercept region 24 oriented to form an acute angle between the path of the advancing fluid and filaments entrained therein and the plane defined by said intercept region.

It has been found that foraminous surface 22 can be a 30×30 wire mesh screen having approximately 51% open area along the full length thereof.

To promote the smooth and continuous movement of filaments along surface 22, filaments 12 should advance along a path almost tangent to or parallel with intercept region 24. It is believed that the angle formed between the plane defined by intercept region 24 and the path of the advancing filaments 12 should be within a range from about 3 to about 12 degrees.

Contiguous and downstream of intercept region 24, concave or separation region 26 is oriented such that at least a portion of said concave region 26 is positioned substantially transverse to said path such that a portion of the moving fluid separates from the filament and passes through the screen and a portion of the fluid moves along said foraminous surface to move said filaments therealong in a smooth and continuous manner.

Perferably blower 14 is of the type disclosed in commonly assigned, contemporaneously filed copending application Ser. No. 099,059 filed Dec. 12, 1979 entitled "Apparatus For Fluidically Attenuating Filaments" in the name of John L. Kane and Vikas M. Nadkarni. The velocity of the gaseous fluid, such as air, can be of the velocities well known in the art, including sonic velocity.

Convex or second arcuate region 28, which is substantially contiguous with concave of first arcuate region 26, as seen by the filaments, is adapted to control the filaments and remaining moving fluid to deposit the filaments upon collection means 16 in a controlled, uniform manner. Convex region can also be of the same foraminous as regions 24 and 26, but could be solid, that is, non-foraminous.

In the absence of a convex region 28, filaments 12 could exhibit a tendency to "ski jump" in an uncontrolled manner which may provide difficulties in achieving a uniformly disbursed collection of filaments. Distal end 30 of foraminous surface 22 can be movable to provide controlled adjustment in the deposition of the filaments upon the collection surface 16.

Furthermore, foraminous surface 22 can be attached to an adjustable frame to permit modification of the radii of curvature of the concave and convex regions 26 and 28 as well as intercept region 24 to accommodate variations in mass flow and the like in the filaments and attenuating fluid to achieve the best possible geometric configuration to provide a controlled separation and dissipation of attenuating fluid and controlled collection of filaments.

By way of illustration, separation system 20 may incorporate a concave region having a radius of curvature within the range from about 4 inches to about 8 inches and a convex region having a radius within the range from about 8 inches to about 16 inches. Generally, the radius of curvature of the convex region 28 should be at least twice the radius of the concave region 26.

In addition, arcuate plate 32 is positioned below and adjacent to concave region 26, that is on the side of screen 22 opposite the side adjacent the filaments 12. Arcuate plate 32 can be substantially concentric with the radius of curvature of the concave region 26, and can be movable along the arc of concave region 26 as well as and radially thereto. The length of plate 22, its relative position along the arc of concave region 26, and the radial distance therefrom influences the ratio of the amount of fluid directed to move along the length of the screen to the amount of fluid passing through the screen and thus being separated from filaments 12. Thus, an additional degree of control is provided in establishing a smooth and continuous movement of the filaments over separation means 20 to collection means 16.

In operation the filaments are formed and directed along a path or several paths defined by a foraminous surface 22. That is, the moving fluid from blower 14 having filaments 12 entrained therein contacts intercept region 24 at a shallow angle along a first path defined by the fluid, such as air, approaching surface 22.

Intercept region is adapted to direct such fluid into substantially tangential contact with a first or upstream portion of concave region 26. As the fluid moves along the concave region 26, a first portion of such fluid passes through foraminous surface 22 at concave region 26 while directing a second portion of such fluid to move along surface 26 to move filaments 12 therealong. That is, the second portion of such fluid is directed along a second path substantially transverse to said first path and then along a third path having a component or vector generally opposite to said first path. The second and third paths are defined by the bottom and upwardly oriented portions of concave region 26, respectively.

Subsequent to the above, the fluid and filaments moving along surface 22 are directed along a fourth path defined by convex region or projection 28 and end 30 to direct filaments 12 to a suitable collection zone or system.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation and collection of continuous and/or staple inorganic or organic filaments, such as glass, polystyrene, polypropylene and the like.

I claim:
1. Apparatus for forming filaments comprising:
    means for supplying a plurality of streams of molten material;
    attenuation means for supplying a moving fluid to attenuate said streams into said filaments, said filaments being entrained in said fluid moving from said attenuation means; and
    means for separating a portion of said entraining fluid from said filaments comprising a foraminous surface having;
    (a) an intercept region oriented to form an acute angle between a path defined by the entrained filaments approaching said foraminous surface and said intercept region; and
    (b) a concave region contiguous with said intercept region oriented such that at least a portion of said concave region is positioned substantially transverse to said path such that a portion of said fluid passes through said foraminous surface and a portion of said fluid moves along said foraminous surface to move said filaments along said surface.

2. The apparatus of claim 1 wherein said foraminous surface has a convex region downstream of and substantially contiguous with said concave region to control the fluid and filaments moving from said concave region.

3. The apparatus of claims 1 or 2 further comprising a plate positioned below and adjacent the concave region adapted to control movement of the filaments along said surface.

4. The apparatus of claim 3 wherein said plate is substantially concentric with said concave region.

5. The apparatus of claim 4 wherein said plate is movable.

6. The apparatus of claim 5 wherein said plate is movable along the arc of the concave region and radially thereto.

7. The apparatus of claim 2 wherein said foraminous surface is flexible to permit adjustment in the geometry of the intercept, concave and/or convex regions.

8. The apparatus of claim 2 wherein the radius of curvature of said convex region is at least twice the radius of curvature of said concave region.

9. The apparatus of claim 8 wherein said separation means operates in the absence of a vacuum means at said concave region.

* * * * *

UNITED STATES PATENT AND TRADEMARK OFFICE
CERTIFICATE OF CORRECTION

PATENT NO. : 4,284,395
DATED : August 18, 1981
INVENTOR(S) : John L. Kane

It is certified that error appears in the above—identified patent and that said Letters Patent is hereby corrected as shown below:

At column 1, line 20, the word "collection" should be inserted after the word "controlled".

*Signed and Sealed this*

*Seventeenth* Day of *August 1982*

[SEAL]

Attest:

Attesting Officer

GERALD J. MOSSINGHOFF

*Commissioner of Patents and Trademarks*